(12) United States Patent
Troutman et al.

(10) Patent No.: US 9,175,179 B2
(45) Date of Patent: Nov. 3, 2015

(54) PRINTING INK AND COATING COMPOSITIONS CONTAINING DERIVATIVES OF STARCH AND MODIFIED STARCH

(75) Inventors: Malisa Troutman, Carlstadt, NJ (US); Irena Bienkowski, Carlstadt, NJ (US); Nicole Harris, Carlstadt, NJ (US); Jeannette Truncellito-Simoni, Carlstadt, NJ (US)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 120 days.

(21) Appl. No.: 13/129,962

(22) PCT Filed: Nov. 16, 2009

(86) PCT No.: PCT/US2009/064571
§ 371 (c)(1),
(2), (4) Date: Jun. 6, 2011

(87) PCT Pub. No.: WO2010/059562
PCT Pub. Date: May 27, 2010

(65) Prior Publication Data
US 2011/0229700 A1    Sep. 22, 2011

Related U.S. Application Data

(60) Provisional application No. 61/115,659, filed on Nov. 18, 2008.

(51) Int. Cl.
| | |
|---|---|
| C09D 11/00 | (2014.01) |
| C09D 11/08 | (2006.01) |
| C08B 31/04 | (2006.01) |
| C09D 11/101 | (2014.01) |
| C09D 11/14 | (2006.01) |
| C09D 103/02 | (2006.01) |
| C09D 103/06 | (2006.01) |

(52) U.S. Cl.
CPC ............... *C09D 11/08* (2013.01); *C08B 31/04* (2013.01); *C09D 11/101* (2013.01); *C09D 11/14* (2013.01); *C09D 103/02* (2013.01); *C09D 103/06* (2013.01); *Y10T 428/24802* (2015.01)

(58) Field of Classification Search
CPC ................................ C09D 11/08; C09D 11/14
USPC ............ 106/31.38, 31.39, 31.7, 31.71, 206.1, 106/207.1
See application file for complete search history.

(56) References Cited

U.S. PATENT DOCUMENTS

| | | | |
|---|---|---|---|
| 3,607,813 A * | 9/1971 | Purcell et al. ................... | 524/88 |
| 4,061,611 A | 12/1977 | Glowaky et al. | |
| 4,095,992 A | 6/1978 | Rudolph et al. | |
| 4,310,356 A * | 1/1982 | Trubiano et al. ........... | 106/31.71 |
| 6,090,884 A * | 7/2000 | Hurley et al. ................. | 524/734 |
| 6,294,013 B1 * | 9/2001 | Ortlano et al. ................ | 106/499 |
| 6,620,880 B2 * | 9/2003 | Horley et al. ................. | 524/842 |
| 8,076,397 B2 * | 12/2011 | Simpson, Sr. ................... | 524/54 |
| 2004/0122166 A1 | 6/2004 | O'Brien-Bernini et al. | |
| 2007/0287777 A1 | 12/2007 | Kawamura et al. | |
| 2007/0289486 A1 * | 12/2007 | Apostol et al. ............. | 106/31.39 |
| 2010/0162921 A1 * | 7/2010 | Omatsu et al. ............... | 106/31.7 |

FOREIGN PATENT DOCUMENTS

| | | |
|---|---|---|
| EP | 0204353 | 12/1986 |
| JP | 2004-292746 A | 10/2004 |
| WO | WO 9115548 | 10/1991 |

OTHER PUBLICATIONS

Definition of Keyless inking (indirect flexo), The Printing Ink Manual, p. 335.*
Patil, D. R., G. F. Fanta, et al. (2008). "Application of hydrophilic starch-based coatings on polyethylene surfaces." Journal of Applied Polymer Science 108(5): 2749-2755.
Cao, X.; Chang, P. R.; Huneault, M.A. "Preparation and properties of plasticized starch modified with poly(ϵ-caprolactone) based waterborne polyurethane" Carbohydrate Polymers, vol. 71, Issue 1, Jan. 1, 2008, pp. 119-125.
Zhang, Y., H. Lin, et al. (1990). "QYH-I printing paste. I. Mechanism of reaction using ethylene chlorohydrin as etherification agent." Tianran Chanwu Yanjiu Yu Kaifa 2(3): 101-4.
Byung Y. Yang and Rex Montgomery "Preparation and Physical Properties of Starch Mixed Esters" Starch/Starke 60 (2008) 146-158.
"Allyl Starch: A new raw material for the printing ink industry", American Ink Maker, 28 (No. 5), pp. 27-29, 59, 61, and 63, (May 1950).
Alekseeva, O.V., O.V. Rozhkova et al. (1996); "Improvements of printing technology of cotton fabrics," Tekstil'naya Promyshlennost (Moscow)(3): 33-34 (with English description).

* cited by examiner

*Primary Examiner* — Veronica F Faison
(74) *Attorney, Agent, or Firm* — Charles C. Achkar; Ostrolenk Faber LLP

(57) ABSTRACT

A printing ink or coating composition contains optionally colorant and one or more derivatives of starches or modified starches.

29 Claims, No Drawings

PRINTING INK AND COATING COMPOSITIONS CONTAINING DERIVATIVES OF STARCH AND MODIFIED STARCH

This application is a national stage application of PCT/US2009/064571, filed on Nov. 16, 2009, which claims priority to U.S. provisional application No. 61/115,659, filed on Nov. 18, 2008, all of which are hereby incorporated by reference in their entirety.

BACKGROUND

Patent Literature Prior Art

EP1529820 provides the use of carbohydrates carrying aldehyde and/or carboxyl groups, as binders, thickeners, and rheology modifiers in e.g. coatings (such as primers, paints, lacquers and varnishes), inks and adhesives. The oxidized carbohydrates are especially starch-like polymers having relatively high degrees of substitution for carboxyl groups and additionally contain aldehyde groups. The molecular weight of these carboxylated carbohydrates is at least 100,000 D.

U.S. Pat. No. 4,061,611 relates to aqueous compositions, e.g. coating compositions such as latex paints and to the process for preparing dispersions of pigments and polymeric resins in aqueous mediums with a dispersing agent. The dispersing agent consists of mixed esters of starch characterized as having pendant carboxylic acid groups and an average degree of substitution ranging from 0.5 to 3.0 wherein at least about 10 mole percent of the pendant carboxyl groups are neutralized. These mixed esters of starch or dispersants are derived from the low molecular weight hydrolyzed starch molecules having a plurality of anhydroglucose units and a combination of acylating agents consisting of at least one anhydride of a polycarboxylic acid and at least one anhydride of a monocarboxylic acid and/or the acyl halide of said monocarboxylic acid.

Similarly, U.S. Pat. No. 4,061,610 relates to aqueous compositions, e.g. coatings such as latex paints and to the process of preparing aqueous dispersions of pigment and a polymeric resin in an aqueous medium with a dispersing agent consisting of half-esters of starch characterized as having pendant carboxyl groups and an average degree of substitution ranging from 0.25 to 3.0 wherein at least 10 mole percent of said pendant carboxyl acid groups are neutralized. These half-esters of starch or dispersants are derived from low molecular weight hydrolyzed starch molecules having a plurality of anhydroglucose units and acylating agents consisting of at least one cyclic anhydride of polycarboxylic acids. In these compositions, the starch-based material has pendant carboxylic groups and functions as a pigment dispersant. In contrast, the starches used in our invention can function as binders and do not have to contain pendant carboxylic groups or be synthesized as mixed esters or half esters. Use of these esters in printing inks is not taught. The compositions of our invention are suitable for flexographic, gravure, or offset printing inks, as opposed to latex paints.

JP2004223786 provides an anchor agent excellent in the adhesion of a biodegradable film and biodegradable printing ink, in particular a polylactic acid film and ink containing polycaprolactone and/or esterified starch as a binder, and a biodegradable laminate using the anchor agent.

Low molecular-weight starches and modified starches have been described as binders in inkjet inks, as taught in US20070197685. However, inkjet inks do not have the rheological characteristics suitable for flexographic, gravure, or lithographic printing methods.

It is well known that small amounts of certain modified starches or starch derivatives may be used to adjust viscosity, such as described in U.S. Pat. No. 4,648,905.

Certain starch derived products such as corn syrup have been used in edible inks with edible colorants such as those described in U.S. Pat. No. 6,063,412 and U.S. Pat. No. 6,579,555. These inks are typically not useful for producing durable printed materials on non-edible substrates via a flexographic, gravure, or lithographic process.

U.S. Pat. No. 6,043,297 claims a yellow ink composition comprising: C.I. Pigment Yellow 74 as a colorant; and a styrene-(meth)acrylic acid-based, water-soluble resin. The ink can comprise a saccharide, such as monosaccharides, disaccharides, or oligosaccharides. Preferred saccharides tend to be monosaccharides, and inkjet inks prepared with the compositions are exemplified.

PCT application WO2006/060784 describes aqueous printing ink and coating compositions containing a colorant, one or more high molecular weight starches and one or more water soluble acrylic polymers or co-polymers. These starches have a number average molecular weight of at least about 100,000, preferably at least about 200,000, and most preferably at least about 250,000. A particularly preferred source of high molecular weight starch is LPR41 polysaccharide, a dispersion of starch from corn in polyethylene glycol and water, available from Lorama Chemicals.

U.S. Pat. No. 7,026,390 provides a variety of extended polyacrylic acid based binder compositions comprising a low molecular weight polyacrylic acid (typically hypophosphite or sulfite terminated), a crosslinking agent (such as triethanolamine or glycerol) and one or more water soluble materials, such as lignin, low molecular weight starch and soybean protein. The binder compositions comprise either a cure catalyst, a water-soluble lignin extender, or soybean protein and are useful in the glass fiber industry.

EP0911361 discloses polysaccharide based thermosetting systems and compositions which utilize such thermosets. The composition comprises a polysaccharide having a weight average molecule weight of at least 10,000 and a polycarboxylated polymer having at least two carboxylic acid functional groups and a weight average molecular weight of at least 1,000. The polysaccharide can be selected from the group consisting of starch, cellulose, gums, alginates, pectin, gellan and modifications or derivatives thereof. The polysaccharide molecule must be present in amounts effective to provide crosslinked compositions.

US2003228470 discloses a two-layer protective coating system for glass surfaces. The base coating comprises at least one polysaccharide, and the top coating has a lower solubility in water than the base coating. The second coating may be a polysaccharide coating composition modified by adding (i) glyoxal; (ii) octenyl succinic anhydride; (iii) at least one water-insoluble resin; (iv) at least one water-repellent additives; (v) at least one latex dispersion; or (vi) any mixture of at least two of (i), (ii), (iii), (iv) and (v).

U.S. Pat. No. 6,423,775 describes a graft polymer based on derivatized starch or derivatized starch product as the graft substrate, wherein the starch or starch product is derivatized by one or more bifunctional monomers containing (i) a vinyl group, and (ii) a functional group that can be condensed with a free hydroxyl group present in the starch or starch product. The starch starting material may be one or more hydrolyzed starches, and the graft polymer can serve as a binder in printing inks. It is noted that the grafting process improves stability by preventing retrogradation. One of the features of the compositions of the present invention is improved stability without the use of grafted starch copolymers.

US20060257441 describes dispersions containing an insect pest repellent active substance, which may be used in adhesives, bonds, inks, or resin products. Among the claims is a sanitary insect pest repellent active ink containing a natural essential oil sanitary insect pest repellent. It is taught that the ink may contain one or more of a variety of modified or derivatized starches, and may be applied by conventional printing methods such as flexo printing, screen printing, gravure printing, and the like.

US20070088099 discloses aqueous filmogenic compositions, including pigment preparations, which comprise an organic phase comprising a biodegradable polymer such as starches which are highly acetylated or rendered hydrophobic by fixed fatty chains, and from 0.5% to 6% of a stabilizing agent, where the organic phase is dispersed into a dispersing aqueous phase. US20070088099 does not disclose the use of low molecular weight starches, and our invention does not necessarily require the use of a stabilizing agent, or dispersion of a highly acetylated or fatty acid-modified starch into an aqueous phase.

US20040121675 describes a printed polymeric substrate comprising: a polymeric substrate; a coating or other surface treatment on at least a portion of the polymeric substrate, the coating comprising at least one of a polysaccharide, a modified polysaccharide, a derivative of a polysaccharide, or a derivative of a modified polysaccharide; and a pattern or other indicia comprising an ink composition printed on at least a portion of the portion of the polymeric substrate that is coated with at least one of a polysaccharide, a modified polysaccharide, a derivative of a polysaccharide, or a derivative of a modified polysaccharide. Several treatment compositions comprising cellulose derivatives are exemplified. It is taught that the ink composition itself may comprise a polysaccharide, a modified polysaccharide, a derivative of a polysaccharide, or a derivative of a modified polysaccharide to further improve transfer and/or adhesion of the ink composition to the coated substrate. There are no examples in US20040121675 exemplifying the use of starch-based materials in inks, and no information or examples exemplifying improved color strength due to presence of starch-based materials.

US20090088498 describes printing ink base materials comprising a dextrin and a blend vehicle, where the dextrin is a water-soluble dextrin, where the water-soluble dextrin comprises water-soluble dietary fiber, and where the blend vehicle is a water-based emulsion. The document states that a highly important technical advantage of the compositions is an increased viscosity over other compositions known in the art. [0148] The dextrin materials increase total non-volatile solids in the base material, which subsequently increases the viscosity of the base material. [0030] The base material is then made into a printing ink with increased viscosity. Additionally, color strength of prints resulting from the compositions of US20090088498 can be improved by the presence of a dispersant, because the dispersant permits a higher percentage by weight of pigment to be added to the printing ink base material then if the dispersant was not present. [0146] In contrast, the printing ink compositions of our invention are reduced to an equal or lower viscosity/solids level when compared with inks which do not contain the starches described herein. Yet, prints produced using our ink compositions exhibit equal color strength at lower pigment loading when compared with inks which do not contain the starches described herein. No information or examples in US20090088498 exemplify improved color strength due to presence of starch-based materials.

Non-Patent Prior Art Literature

Patil, D. R., G. F. Fanta, et al. (2008). "Application of hydrophilic starch-based coatings on polyethylene surfaces." Journal of Applied Polymer Science 108(5): 2749-2755.

Cao, X.; Chang, P. R.; Huneault, M. A. "Preparation and properties of plasticized starch modified with poly($\epsilon$-caprolactone) based waterborne polyurethane" Carbohydrate Polymers, Volume 71, Issue 1, 1 Jan. 2008, Pages 119-125

Torovko, N. N., G. G. Andreeva, et al. Zhurnal Prikladnoi Khimii (Sankt-Peterburg) 72(10): 1708-1712.

Zhang, Y., H. Lin, et al. (1990). "QYH-1 printing paste. I. Mechanism of reaction using ethylene chlorohydrin as etherification agent." Tianran Chanwu Yanjiu Yu Kaifa 2(3): 101-4.

Alekseeva, O. V., O. V. Rozhkova, et al. (1996). "Improvement of printing technology of cotton fabrics." Tekstil'naya Promyshlennost (Moscow)(3): 33-34.

Byung Y. Yang and Rex Montgomery "Preparation and Physical Properties of Starch Mixed Esters" Starch/Stärke 60 (2008) 146-158

Use of allyl starch in printing inks was described in American Ink Maker, 28 (No. 5), 27,59,61,63 (1950).

The materials of the invention are preferably derived from renewable resources as opposed to commonly used resins in the prior art which are derived from non-renewable petroleum reserves. The polysaccharide-based materials can be incorporated at higher solids/lower viscosities than conventional materials and can be more effective at dispersing pigments and other less soluble/less compatible materials than conventional dispersing agents. They can allow for use of more environmentally friendly solvents, or use of water, or can be used in solventless formulations. The polysaccharide-based materials can be easily shipped in solid form and can be readily solubilized for easy formulation onsite, thus reducing the volume required for shipping (100% solids as compared to solutions) and increasing the shelf-stability (solids are more resistant to bacterial growth than solutions). Inventive ink and coating formulations containing the polysaccharide-based materials may exhibit improved rheology; improved compatibility; improved resolubility; improved emulsification; reduced toxicity; lower levels of VOCs; reduced odor; and improved pigment wetting. Prints produced using the inventive compositions can exhibit higher gloss; improved repulpability, improved adhesion to substrates, and better durability. Unexpectedly, prints produced by using the inventive compositions can exhibit higher color strength at lower pigment loadings. The compositions can be easier to clean off press and can be used with more environmentally friendly washes. Substrates printed with the inventive formulations may exhibit improved recyclability, biodegradability, and compostability. In particular, biobased and/or biodegradable substrates printed or coated with the inventive formulations and materials can exhibit improved biobased content, compostability/biodegradability, and carbon footprint.

DETAILED DESCRIPTION OF THE INVENTION

Described are printing ink and coating compositions containing one or more low molecular weight starches or chemically modified starch derivatives and optionally a colorant. Starches can be obtained from a variety of sources including corn, rice, tapioca, sorghum, potato, wheat, barley, millet, etc. Native starch can be broken down into simpler carbohydrates using, for instance, acids, various enzymes, or a combination of the two, to create materials which are referred to as starch derivatives. The extent of conversion is typically quantified by dextrose equivalency (DE), which is roughly the fraction of the glycoside bonds in starch that have been broken. In general, as DE increases, molecular weight decreases. Low molecular weight starches include, but are not limited to, maltodextrin; dextrin—a lightly hydrolyzed (DE typically of about 10-20) starch product used as a bland-tasting filler and thickener; various corn syrups/corn syrup solids (DE typically of about 30-70), which are used as sweeteners and thickeners in many kinds of processed foods; dextrose (also known as glucose—DE typically of about 100), prepared by the complete hydrolysis of starch; or high fructose syrup, which is made by treating dextrose solutions with the enzyme glucose isomerase until a substantial fraction of the glucose has been converted to fructose. Low molecular weight starches can also be prepared using dry heat; these are often termed "pyrodextrins" or dextrins, which include, for instance, white dextrins, yellow dextrins, or British gums. The major reactions [during the heating process] include hydrolysis, transglucosidation and repolymerization. These reactions have been described in "Modified Starches: Properties and Uses", O. B. Wurzburg, CRC Press Inc., 1987." The repolymerization step results in starch molecules with increased branching. Yellow dextrins are perhaps more preferable to white dextrins or British gums because they have better solution stability and cold (room temperature) water solubility than white dextrins, but are lighter in color than British gums. Cyclodextrins, toroidal structures of 6-8 glucose residues, can be synthesized by enzymatic degradation of starch by specific bacteria, such as *Bacillus macerans*. These have found use as colorant stabilizers [U.S. Pat. No. 6,168,655 B1 Kimberly-Clark Worldwide, Inc. (Neenah, Wis.) (2001)]. The following represent some trade names and commercial products of derivatized starches: Globe 42DE (corn syrup solids) and Globe 28DE (corn syrup solids) (Corn Products); Maltrin M180 (maltodextrin) and Maltrin M040 (maltodextrin) (Grain Processing Corp.); ICB 3000 (maltodextrin) and ICB 3200 (maltodextrin) (Tate & Lyle).

Low molecular weight refers to a number average molecular weight (MW) of less than about 100,000 as tested according to the following test method: MW is determined by GPC using a series of four Phenogel columns with pore sizes of 500, 5000, 50,000, and 500,000 Å, using ACS reagent grade DMSO with 0.5% (w/v) LiCl as mobile phase. RI detection is used. Samples and standards are dissolved in DMSO at a concentration of 10 mg/mL and filtered through 0.45 μm Nylon Acrodiscs. Injection volume is 100 μL, and flow rate is 1.0 ml/min. Column temperature is 80° C. Molecular weight calibration is performed using pullulan standards with known molecular weights in the range of 320-400,000 g/mol. (Note that starches which have been chemically modified with a high degree of substitution can be characterized under more standard GPC conditions using THF as the mobile phase and polystyrene standards.)

Chemically modified starches include starch materials of a wide range of molecular weight and DE, but are defined in this work as any starch that has been modified by chemical reaction (for example, etherification/esterification of hydroxyl group on the starch backbone). The starting starch material will likely be a starch derivative, because it will be hydrolyzed from native starch to reduce the molecular weight and provide different viscosity grades, although it is also possible to first perform the chemical modification, followed by subsequent hydrolysis of the modified native starch. Chemically modified starch that also has been hydrolyzed can be described as modified starch derivative or derivative of modified starch. The following examples of some modified starches have been coded according to the International Numbering System for Food Additives (INS) [http://en.wikipedia.org/wiki/Starch#Sources_of_starch Accessed on 22 Aug. 2008]: 1403 Bleached starch, 1404 Oxidized starch, 1410 Monostarch phosphate, 1411 Distarch glycerol, 1412 Distarch phosphate esterified with sodium trimetaphosphate, 1413 Phosphated distarch phosphate, 1414 Acetylated distarch phosphate, 1420 Starch acetate esterified with acetic anhydride, 1421 Starch acetate esterified with vinyl acetate, 1422 Acetylated distarch adipate, 1423 Acetylated distarch glycerol, 1440 Hydroxypropyl starch, 1442 Hydroxypropyl distarch phosphate, 1443 Hydroxypropyl distarch glycerol, 1450 Starch sodium octenyl succinate. In the literature, terms such as starch derivatives and modified starches are sometimes used interchangeably.

Conventional means to chemically modify starches also include esterification, by reaction with acid, acid chloride, anhydrides, etc. or by etherification with alkyl halides, alkylene oxides, etc. A preferred embodiment of the current invention is a printing ink or coating composition comprising one or more starch ester comprises ester units of one or more aliphatic, unsaturated hydrocarbon, or aromatic moieties with 1 to 18 carbon atoms, and in which the starch ester degree of substitution is about 0.1 to about 3.0, and more preferably about 1.5 to about 3.0. Copolymers of starch may also be synthesized to tune polymer properties of starch. Typically, graft-from reactions, either by free radical polymerization or ring-opening polymerization or condensation, are performed to generate starch-based materials with improved compatibility or performance. By chemically modifying starch, it has been shown that the properties of starch can be tuned over a wide range. [Byung Y. Yang and Rex Montgomery "Preparation and Physical Properties of Starch Mixed Esters" Starch/Stärke 60 (2008) 146-158].

Starches are more broadly classified as polysaccharides or oligosaccharides. Types of polysaccharides include starch, cellulose, chitin, chitosan, pullulan, callose or laminarin, xylan, mannan, fucoidan, and galactomannan., hemicelluloses (xylan, glucuronoxylan, arabinoxylan, glucomannan, and xyloglucan, etc). With respect to food, starch is also termed carbohydrates, simple carbohydrate (mono-, disaccharides), or complex carbohydrates. Chemically modified polysaccharides are polysaccharides that have been processed or treated to change their chemical functionality and properties, especially solubility and rheology. Polysaccharide derivatives have been processed or treated to reduce their molecular weight, which like chemical modification, can also affect properties such as solubility and rheology.

A feature of the ink and coating compositions of the present invention is that they can be applied via virtually any printing method, such as lithography, flexography, letterpress, or gravure. They can be oil-based, solvent-based, aqueous, or solventless. Solvents typically employed for ink and coating formulations include but are not limited to water, acetates, alcohols, ketones, glycol ethers, esters, aliphatic and aromatic hydrocarbons or other petroleum distillates, or blends thereof. The inks or coatings are useful for printing on a variety of substrates, including but not limited to, paper, kraft, bleached, corrugated substrates, towel and tissue substrates, folding cartons, wrapping paper, paper cups, containers, labels, multiwall bags, newsprint, inkjet recording paper, plastic film, plastic, glass, metal foil, or textile. Substrates may be coated or uncoated, and may comprise one or more layers or laminated structures combining one or more materials. In some cases, substrates may comprise biobased, compostable, degradable, oxodegradable, recycled, and/or recyclable material.

Ink/coating formulations and printed/coated substrates exhibiting improved compostability may exhibit improvements in one or more of the following areas: biodegradability, disintegration, and ecotoxicity. Biodegradability is a measure of a material's ability to be chemically broken down and/or consumed by microorganisms. Disintegration is a measure of the rate at which a material chemically or physically breaks down under a defined set of circumstances. Ecotoxicity measures undesirable effects of a material on flora and fauna in the environment, for instance in soil or in aquatic systems.

The printing ink and coating compositions of the invention contain one or more low molecular weight starches and/or one or more chemically modified starch derivatives. They can be formulated with high loadings of chemically modified starch derivatives or low molecular weight starches without cooking while exhibiting good stability. It is well known in the art that hydrolyzed starch exhibits greater solubility in water compared to native starches. The solubility of starches is also affected by pretreatment of the starch. Starches that are pre-gelled are readily cold (room temperature) water soluble; whereas, other starches have to be cooked to "gel" the starch granules. Starch is considered gelatinized when the granule structure has been disrupted and swelled.

Some high molecular weight starches cannot be formulated into water-borne inks except at low levels; otherwise, the viscosity of the resulting formulations may be so high that the ink must be diluted substantially prior to use, resulting in loss of color strength. Also, certain starches must be cooked in order to dissolve/disperse them into water. In addition, some starch formulations are not stable over a period of time required to make them useful as ink and coating products. This can be the result of a process called retrogradation, in which the starch molecules form intermolecular associations. Native starches often exhibit retrogradation, unless they are genetic "waxy" hybrids that are amylose-free (100% amylopectin). Retrogradation can be inhibited or greatly reduced by hydrolyzing starch to lower molecular weight and/or chemically modifying the starches to impede inter- and intramolecular interactions that result in retrogradation. Some starch-based materials can be easily dissolved or dispersed at reasonably high solids level without the aid of additives, heat, or pH adjustment. These starches have often been hydrolyzed to lower molecular weight or otherwise chemically modified or physically treated to enable facile solution preparation. Conventionally, coatings formulated with these starch-based materials often do not have sufficient water resistance to meet application needs.

Chemical modification of starch can be used to tune the physical properties of starch, such as its solubility in aqueous or organic solvents, or rheology, or its utility as a dispersant. Furthermore, modified starches and starch derivatives can be compatible with acrylics or polyurethanes, or melamine-formaldehyde resin, suggesting the compatibility of starch with other polymers can be improved by chemically modifying the starch. US20080027174 describes resins (A) obtained by bonding a vinyl polymer onto starch and/or modified starch by graft polymerization, and resins (C) obtained by reacting the resin (A) with an isocyanate group-containing product (B) obtained by reacting a polyisocyanate compound (b1) with a polyhydric alcohol (b2), which can function as binders in a one-pack lacquer. The materials can be dissolved or dispersed into an organic solvent-based medium.

We have found that inks and coatings comprising certain hydrolyzed or chemically modified starches can be formulated without difficulty to give low viscosity, stable inks that when applied to a substrate, result in a coating or ink layer that has good water resistance without compromising color strength. In addition, the inks may exhibit improved color strength, gloss, heat resistance, pH stability, resolubility and repulpability.

A preferred embodiment of the current invention, as exemplified in Examples 1-8, is a printing ink or coating composition containing a hydrolyzed starch and/or starch derivative where the number average molecular weight is less than about 100,000. Another preferred embodiment of the current invention, as exemplified in Examples 9-15, is a printing ink or coating composition in which the hydrolyzed starch and/or starch derivative has been chemically modified, but has a number average molecular weight of less than about 100,000 prior to modification. Another preferred embodiment of the current invention is a printing ink or coating composition containing a hydrolyzed starch and/or starch derivative with a DE in the range of about 5 to about 50. Another preferred embodiment of the current invention is a printing ink or coating composition containing a hydrolyzed starch and/or starch derivative that has been chemically modified, but with a DE in the range of about 5 to about 50 prior to modification. More preferred ranges include those with a DE of about 5 to about 30, and those with a DE of about 5 to about 20.

The modified and hydrolyzed starches are suitable for a range of solvent systems commonly found in printing inks. The solvency characteristics of these systems can be expressed by the Hildebrand solubility parameter ($\delta$). The Hildebrand solubility parameter of a solvent is equal to the square root of the cohesive energy density, which in turn can be calculated from $(\Delta H-RT)/V_m$, where $\Delta H$ is heat of vaporization, R is the gas constant, T is temperature, and $V_m$ is the molar volume. Hildebrand solubility parameters and related quantities for many solvents can be found in reference works such as the "CRC Handbook of Solubility Parameters and Other Cohesion Parameters" by Allan F. M. Barton (CRC Press). Hildebrand solubility parameters can also be estimated by taking the square root of the squares of the solvent's three Hansen solubility parameters, i.e., $\delta=(\delta_D^2+\delta_P^2+\delta_H^2)^{1/2}$. Hansen solubility parameters of common solvents can be found in reference works such as "Hansen Solubility Parameters: A User's Handbook" by Charles M. Hansen (CRC Press). For a blend of n solvents, such as a solvent system used in printing inks, $\delta$ can be estimated by $\delta_{blend}=\delta_1\phi_1+\delta_2\phi_2+\ldots+\delta_n\phi_n$ where $\delta_x$ is the solubility parameter of solvent x and $\phi_x$ is the volume fraction of solvent x in the blend, where $\phi_1+\phi_2+\ldots+\phi_n=1$.

In a preferred embodiment of the current invention, the modified or hydrolyzed starches are soluble or dispersible in a solvent or solvent mixture with a solubility parameter of greater than about 14 $MPa^{1/2}$. In another preferred embodiment of the current invention, the modified or hydrolyzed starches are soluble or dispersible in a solvent or solvent mixture with a solubility parameter of greater than about 29 $MPa^{1/2}$. In another preferred embodiment of the current invention, the modified or hydrolyzed starches are soluble or dispersible in a solvent or solvent mixture with a solubility parameter of about 14 to about 29 $MPa^{1/2}$, and more preferably of about 17 to about 26 $MPa^{1/2}$.

While the printing ink and coating compositions of the present invention contain at least one low molecular weight modified or hydrolyzed starch, it is understood that the inventive inks and/or coatings can also contain a higher molecular weight starch (such as, for example, those described in pending application WO/2006/060784) in combination with the low molecular weight starch.

When the inks or coatings of the invention are waterborne, binder polymer or polymers obtained from mono-ethylenically unsaturated monomers are sometimes present. These are known colloquially as "acrylics". They are usually copolymers of at least two alkyl esters of one or more mono-ethylenically unsaturated carboxylic acids, such as for instance methyl methacrylate/butyl acrylate copolymer, but may also be homopolymers. Any water-compatible or water soluble acrylic polymer which has previously been used as a binder polymer can be employed, such as for example, acrylic polymers and co-polymers, styrene acrylic emulsions, acrylic amide copolymers and co-polymers and/or acrylic colloidal dispersions. Use of the inventive compositions in place of standard acrylics can eliminate the need to employ an excess of amine for acrylic based compositions and thereby reduces any odor otherwise generated from such amines.

The inks of the present invention can optionally contain one or more colorants, alone or in combination. Suitable colorants for use in the present invention include, but are not limited to dyes, organic or inorganic pigments. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83; Pigment Red Numbers 2, 22, 23, 48:1, 48:2, 52, 53, 57:1, 122, 166, 170, 266; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired. Other organic and inorganic pigments appropriate for the colors desired can also be used. The amount of colorant used is generally about 2 to 20 wt. %, and more preferably about 5 to 13 wt. %.

Further additives which may be employed as desired to impart various properties to the printing ink and coating compositions of the present invention include surface tension modifiers, defoamers, preservatives, biocides, dispersants, thickeners and cross-linking agents. Any of the known additives typically employed in inks and coatings can be used. The printing ink may also include waxes such as but not limited to amide wax, erucamide wax, polypropylene wax, paraffin wax, polyethylene wax, teflon, carnuba wax and the like. The wax may be a combination of said waxes. The wax, if present, is typically in an amount of up to about 4 wt. %.

Any printable substrate can be printed with the inventive compositions by any known conventional technique. Among the inventive compositions, waterborne inks are particularly useful in connection with corrugated paper or paperboard products, other cellulosic substrates, and paper products which may be subjected to recycling. As used herein, the "repulpability" of a printed material or substrate is determined by measuring/evaluating the reusability of an unwanted or discarded printed material or substrate (e.g. paper fibers) after the maximum amount of colorant (e.g. pigment) has been extracted from such printed material or substrate.

EXAMPLES

The ink and coating compositions of the present invention are further illustrated by the following non-limiting examples in which all parts and percentages are by weight, unless otherwise indicated.

Examples 1-8

Globe 42DE (corn syrup solids) and Globe 28DE (corn syrup solids) were obtained from Corn Products. Maltrin M180 (maltodextrin) and Maltrin M040 (maltodextrin) were obtained from Grain Processing Corp. ICB 3000 (maltodextrin) and ICB 3200 (maltodextrin) were obtained from Tate & Lyle. DE's, when not known, were estimated using the Lane-Eyron titration method.

LC Vehicle is an acrylic polymer vehicle, and AquaSun is a commercially available acrylic based ink series from Sun Chemical. Pigment dispersion 52-1721 is a dispersion of a blue phthalocyanine pigment.

Inks were formulated by mixing standard inks or ink components with aqueous or organic preparations of the starch-related products. Most of the aqueous preparations were made by mixing the solid starch product and a biocide (Proxyl GXL, 0.3%) into water at room temperature using a Dispermat until the mixture was in solution. Aqueous preparations of Maltrin M040 and ICB 3200 were used immediately. % TNV's (total non volatiles) of the aqueous preparations are based on g solid/g total as prepared and are indicated in the tables below.

Proofs of the formulated inks were prepared using a Pamarco Precision Proofer on the substrates indicated with a 165Q anilox roll. Print density was measured at the bottom part of the proof using a Techkon R410e densitometer, reported as an average of 5 measurements. Water resistance tests involved placing a drop of water on the print and wiping after 10 or 20 seconds, depending on the test. The print was deemed a "pass" if there was no visual marring.

In the following examples, water-based inks were formulated with various hydrolyzed or modified starches (Examples 1-4). The resulting inks had better gloss, and in most cases, equivalent print density at lower pigment loadings, which equates to better mileage, when compared with a reference example containing no starch-based materials (Comparative Example 1), while maintaining water resistance.

Substrate: Kemi-Lite

| Formulas - Components | % TNV | Ex. 1 | Ex. 2 | Ex. 3 | Ex. 4 | Comparative Ex. 1. |
|---|---|---|---|---|---|---|
| AquaSun Blue Ink | | 94% | 94% | 94% | 92.8% | 94% |
| Globe 28DE | 60 | 6% | — | — | — | — |
| Globe 42DE | 60 | — | 6% | — | — | — |
| Maltrin M180 | 60 | — | — | 6% | — | — |
| ICB 3000 | 50 | — | — | — | 7.2% | — |
| Joncryl 89 (acrylic-resin) | 48 | — | — | — | — | 6% |
| TOTAL | | 100% | 100% | 100% | 100% | 100% |

| Test - Results | Ex. 1 | Ex. 2 | Ex. 3 | Ex. 4 | Comparative Ex. 1 |
|---|---|---|---|---|---|
| Initial viscosity Z#2 | 33" | 30" | 35" | 35" | 25" |
| % Reduction (to press viscosity) | 5 | 3 | 6 | 6 | 0 |

-continued

| Test - Results | Ex. 1 | Ex. 2 | Ex. 3 | Ex. 4 | Comparative Ex. 1 |
|---|---|---|---|---|---|
| Final viscosity | 23" | 24" | 22" | 23" | 25" |
| Gloss 60° | 29 | 25 | 32 | 30 | 24 |
| Pigment loading | 11.2 | 11.4 | 11.2 | 11.0 | 11.8 |
| Print density | 2.14 | 2.16 | 2.12 | 2.15 | 2.16 |
| Water Resistance (24 hours) | Pass | Pass | Pass | Pass | Pass |
| DE of hydrolyzed starch | 28 | 44 | 19 | 9 | N/A |

In the following examples, water-based inks were formulated with various hydrolyzed or modified starches (Examples 5-8). The resulting inks had better gloss and better print density when compared with a reference example containing no starch-based materials (Comparative Example 2). Example 8 had equivalent print density at a lower pigment loading. Final viscosity of example 8 was 22".

Substrate: C1S Board

| Formulas - Components | % TNV | Ex. 5 | Ex. 6 | Ex. 7 | Ex. 8 | Comparative Ex. 2 |
|---|---|---|---|---|---|---|
| LC Vehicle | 28 | 50.3% | 50.3% | 50.3% | 50.3% | 37% |
| Maltrin M040 | 30 | 16.7% | — | — | — | — |
| Maltrin M180 | 30 | — | 16.7% | — | — | — |
| ICB 3000 | 30 | — | — | 16.7% | — | — |
| ICB 3200 | 30 | — | — | — | 16.7% | — |
| Joncryl 89 (acrylic-resin) | 28 | — | — | — | — | 30% |
| Pigment dispersion 52-1721 | — | 33% | 33% | 33% | 33% | 33% |
| TOTAL | — | 100% | 100% | 100% | 100% | 100% |

| Test - Results | Ex. 5 | Ex. 6 | Ex. 7 | Ex. 8 | Comparative Ex. 2. |
|---|---|---|---|---|---|
| Initial Viscosity Z#2 | 21" | 19" | 20" | 30" | 24" |
| % Reduction (to press viscosity) | 0 | 0 | 0 | 9 | 0 |
| Gloss 60° | 43 | 45 | 45 | 33 | 30 |
| Print density | 2.21 | 2.1 | 2.15 | 1.95 | 1.89 |
| DE of hydrolyzed starch (estimated) | 7 | 19 | 9 | <3.4 | N/A |

Example 9

Joncryl 61 Solution is a water-based acrylic polymer solution. Rhodoline 999 is a defoamer. BCD9749 Blue dispersion 15:3 is a pigment dispersion of Sunfast® Blue 15:3 pigment.

Low degree of substitution (DS) starch propionate and high DS starch hexanoate are chemically modified starches that were synthesized via the Impeller method following a modified literature procedure [Yang, B. Y.; Montgomery, R. "Preparation and Physical Properties of Starch Mixed Esters" Starch (2008), 60, 146-158. Yang, B. Y.; Montgomery, R. "Acylation of Starch using Trifluoroacetic Anhydride Promoter." Starch (2006), 58, 520-8.] as described below. Using this method, trifluoroacetic anhydride reacts exothermically with a carboxylic acid to form an activated mixed anhydride, which transfers the acyl group of the carboxylic acid to starch via esterification at relatively low temperatures.

Synthesis of Low DS Starch Propionate

Starch propionate with a low degree of substitution (DS) by propionic acid was prepared via the Impeller method as follows: Propionic acid (25 mL, 0.33 mol) and trifluoroacetic anhydride (TFAA) (50 g, 0.24 mol) were charged to a 500 mL 4-neck round bottom flask equipped with overhead stirring, condenser with Vigreux column, nitrogen blanket, thermocouple. Maltrin M040 (DE=7.0) (90 g, 0.56 mol AGU, ca. 1.67 mol OH) was added in small portions to reduce clumping in the mixture at 250 rpm. At the end of the addition, mixture was a thick, white dispersion. The remainder of the trifluoroacetic anhydride (TFAA) (90 g, 0.43 mol) was charged to an addition funnel and positioned on the flask, and added over 18 min. A heating mantle was placed on the flask, and the temperature controller was set at 60° C. for 30 min and increased to 65° C. for an additional 40 min. The product was isolated by precipitation in ca 5/1 n-propanol/water with stirring. The off-white precipitate was isolated by vacuum filtration and washed with n-propanol. The product was dried at 80° C. under vacuum for 2 days. Yield: 45.6 g, 42%. Dried product was a brittle, off-white solid.

Example 10

Preparation of Low Ds Starch Propionate Hydroalcoholic Varnish

The dried low DS starch propionate described above (Ex. 9, 40.2 g), deionized water (182.5 g), and ethanol (45.8 g) were charged to a 250 mL round bottom flask, equipped with condenser, overhead stirrer, nitrogen blanket, thermocouple and heating mantle. The mixture was heated to 70° C. for 3.5 h to form a hazy solution at 15 wt % solids in 80/20 water/ethanol. Proxel GXL (0.4 g) was added to prevent microbial growth.

Example 11

A water-based ink was formulated with the low DS starch propionate varnish from Example 10. The resulting ink was comparable to the reference example, Comparative Example 3.

Initial viscosity was tested using a #2EZ cup. The aged viscosity required aging of the prepared ink sample in a 115° F. oven for 2 days. Print samples were made on mottle stock (kraft stock with a thin layer of bleached kraft fibers on the surface) using a 165-line/17.3 bcm handproofer. These prints were used to measure 60° gloss, density, total color difference, water resistance and visual print appearance.

Water resistance was tested 24 hours after printing by placing one drop of water on the print and then after 10 seconds rubbing the water across the print to the edge, observing staining of the water and the stock. The total color difference (ΔE) was measured using the X-Rite 938 and the QA Master 2000 software using the color measurement committee (CMC) equation. A CMC ΔE of <1.0 is considered acceptable.

Substrate: Mottle Stock (Manufactured by Smurfit-Stone)

| Formulas - Components | % TNV | Ex. 11 | Comparative Ex. 3. |
|---|---|---|---|
| BCD9749 Blue Dispersion 15:3 | 51 | 30.0 | 30.0 |
| low DS starch propionate varnish (Ex. 10) | 15 | 15.0 | — |
| Joncryl 61 Solution | 35.5 | 46.0 | 52.3 |
| Rhodoline 999 | 98.3 | 1.5 | 1.5 |
| Water | — | 7.5 | 16.2 |
| TOTAL | — | 100% | 100% |

| Test - Results | Ex. 11 | Comparative Ex 3 |
|---|---|---|
| Initial viscosity Z#2 | 35.5 | 35 |
| Aged viscosity Z#2 | 33.4 | 36.2 |
| % Reduction (to press viscosity) | 7.75 | 7.00 |
| Gloss 60° | 2.7 | 2.4 |
| Water Resistance (24 hours) | pass | pass |
| ΔE CMC/Strength vs. Comp. Ex. 3 | 0.79/101.89 | — |
| Print appearance | =Ex. 3 | — |

Example 12

Synthesis of High DS Starch Hexanoate

Starch hexanoate with a high degree of substitution (DS) by hexanoic acid was prepared via the Impeller method as follows: Hexanoic acid (215.0 g, 1.85 mol) was charged to a 1 L 4-neck round bottom flask equipped with overhead stiffing, condenser with Vigreux column, nitrogen blanket, and thermocouple. Maltrin M040 (100.3 g, 0.62 mol AGU, ca. 1.85 mol OH) was added in small portions to reduce clumping in the mixture at 250 rpm. At the end of the addition, mixture was a white dispersion. Trifluoroacetic anhydride (TFAA) (778.3 g, 3.7 mol) was charged to an addition funnel in several portions and positioned on the flask, and added over 1 h 51 min. A heating mantle was placed on the flask 1.5 h into the TFAA addition to maintain temperature ca 60° C., and the temperature controller was set at 60° C. for 3 h 45 min. The product was isolated by precipitation in ca 2/1 n-propanol/water with stiffing. The non-solvent was decanted and 500 mL of deionized water was added to extract residual impurities. The sticky peach precipitate was isolated by decanting the water and transferred to an aluminum pan for drying. The product was dried at 80° C. under vacuum for 2 days. Yield: 220.2 g, 78%. Dried product was a hard, flexible, amber transparent solid.

Example 13

Preparation of High Ds Starch Hexanoate Solvent Based Varnish

The dried high DS starch hexanoate described above (Ex. 12, 71.3 g), ethanol (65.2 g), and n-propyl acetate (65.2 g) were charged to a 500 mL round bottom flask, equipped with condenser, overhead stirrer, nitrogen blanket, thermocouple and heating mantle. The mixture was heated to 60° C. for about 1 hr. to form a transparent, low viscosity solution at 30 wt % solids in 50/50 ethanol/n-propyl acetate.

Example 14

Solvent-Based Yellow Ink

N/C Varnish is a nitrocellulose based varnish. Unirez 2215 is a polyamide supplied by Arizona Chemical. Pigment Dispersion 3543-157 is a dispersion of Pigment Yellow 14. In example 14, nitrocellulose varnish was replaced in the letdown by starch hexanoate varnish (ex. 13) and additional solvent to adjust the solids. Example 14 was compared to the reference containing nitrocellulose (Comparative Example 4).

Prints of the solvent-based ink were prepared with a hand-proofer on plastic films, OPP and opaque polyethylene. The following characteristics of the prints were characterized.

Tape adhesion tests were performed using Scotch 610 adhesive tape on the print surface of each of the tested substrates (90 degree angle at slow, then fast speed). Ice crinkle test were performed by cutting the proofs to at least a ~2" square size, crinkled up into a loose ball by hand, then immersed into a container filled with cold (room temperature) water and 6 medium sized ice cubes. After 30 minutes, each print is removed and tested individually. The latter part of the test is performed by holding the print between two sets of thumb and forefingers, bringing the thumbs together until the print portion being held in one pair of fingers is in light contact with the print portion being held in the other pair of fingers. Then, without undue stretching of the film, the two pairs of fingers hold the substrate piece between them in a radius of approx. 2 in. and were rotated using a bicycle pedal type motion at a rate of approx. 10 cycles in 4 seconds. The print was observed for cracks in the print or flaking of the ink from the film surface. Opacity was determined using a Spectraflash, in which the L value was measured in a transmittance setup of the Color Tools program. The lower the value, the lower the opacity. The viscosity of the inks was determined using a Signature Zahn cup (Zahn #2SZ). Readings are similar to those of standard #2 Zahn cups, but not necessarily identical.

Replacement of nitrocellulose in the letdown varnish with starch hexanoate varnish (Ex. 13) resulted in an ink (Ex 14) with lower viscosity and higher opacity at equivalent pigmentation compared to the reference example (Comparative Example 4). Example 14 also retained overall good performance on film substrate, with excellent adhesion to film and ice crinkle performance.

Substrate: T-523-3 OPP (Manufactured by AET)

| Formulas - Components | % TNV | Ex. 14 | Comparative Ex 4 |
|---|---|---|---|
| High DS Starch Hexanoate (Ex. 13) | 35 | 11.2 | — |
| N/C Varnish | 26 | — | 15 |
| Unirez 2215 | 100 | 19.3 | 19.3 |
| Wax Compound | 46.5 | 7.1 | 7.1 |
| Ethanol | — | 31.3 | 30.1 |
| N-propyl Acetate | — | 5.6 | 3.4 |
| Heptane | — | 10 | 10 |
| Tap Water | — | 0.5 | 0.5 |
| Pigment Dispersion (3543-157) | — | 15 | 15 |
| TOTAL | — | 100% | 100% |

| Test - Results | Ex. 14 | Comparative Ex 4 |
|---|---|---|
| Initial viscosity SZ#2 | 21.8" | 28.8" |
| % Reduction (to press viscosity) | 0 | 0 |
| Pigment loading | 9.7 | 9.7 |
| Print density #1 bar | 1.82 | 1.83 |
| Opacity:L-value (higher = more opaque) | 46.6 | 42.7 |
| DE of hydrolyzed starch (estimated) | 7.0 | N/A |

Example 15

UV Radiation Curable Flexographic Ink

To show that the low molecular weight starches described above could be used to make a UV radiation curable flexographic ink, the following formula was made and found to have acceptable on-press print performance.

| Material | % |
| --- | --- |
| Acrylate Monomer | 31.2 |
| High DS starch hexanoate, 62.7 wt % in TMPTA | 5 |
| Adhesion Promoter | 5 |
| Dispersant | 1 |
| Initiator | 5 |
| Amine synergist | 2.5 |
| Pigment | 50 |
| Inhibitor | 0.2 |
| Defoamer | 0.1 |
| Total | 100 |

Other Ink Formulas

The following are typical formulas for various ink types in which the starches of the present invention could be incorporated. Other formulations typically employed to make printing inks are also possible.

| EB or UV radiation curable dry offset ink | |
| --- | --- |
| Pigment | 0-25% |
| Starch | 1-70% |
| Acrylate monomer | 1-20% |
| Oligomer | 1-70% |
| Photoinitiator | 0-20% |
| Additives | 0-5% |

| Conventional dry offset ink | |
| --- | --- |
| Pigment | 0-25% |
| Starch | 1-50% |
| Butyl carbitol solvent | 10-55% |
| Ink Resin | 1-50% |
| PE wax | 0-5% |
| Additives | 0-5% |

| Gravure ink | |
| --- | --- |
| Pigment/dyestuff | 0-12% |
| Extender pigment | 0-8% |
| Starch | 1-30% |
| Resin | 1-50% |
| Solvent | 40-60% |
| Additives | 0-10% |

| Water-based inks (paper and board) | |
| --- | --- |
| Pigment | 0-25% |
| Starch | 1-50% |
| Water based varnish | 1-60% |
| Wax | 0-5% |
| Solvent | 0-8% |
| Water | 1-50% |
| Additives | 0-5% |
| Water-based inks (paper and board) - alternative formula | |
| Pigment | 0-25% |
| Starch | 1-50% |
| Acrylic Emulsion | 1-60% |
| Water | 1-25% |
| Monoethylamine | 0-4% |
| Additives | 0-5% |

| Solvent based ink | |
| --- | --- |
| Pigment | 0-14% |
| Ink resin | 1-40% |
| Starch | 1-30% |
| Nitrocellulose varnish | 1-40% |
| Additives | 0-5% |
| Solvent | 5-40% |

| UV radiation curable ink | |
| --- | --- |
| Pigment | 0-25% |
| Starch | 1-40% |
| Monomers/oligomers | 2-30% |
| Photoinitiators | 1-10% |
| Additives | 0-5% |

What is claimed is:

1. A printing ink or coating composition comprising one or more hydrolyzed starch, starch derivative or chemically modified starch, wherein at least one of the starches either has a number average molecular weight of less than about 100,000 or had a number average molecular weight of less than about 100,000 which has been increased to greater than about 100,000 by chemical modification, wherein the viscosity of the composition is suitable for a printing process including flexography and gravure printing and wherein at least one of the starches has a dextrose equivalency (DE) in the range of about 5 to about 50.

2. The composition of claim 1 in which the starch has a number average molecular weight of less than about 100,000.

3. The composition of claim 1 further comprising a colorant.

4. The composition of claim 1 in which at least one of the starches is a maltodextrin.

5. The composition of claim 1 in which at least one of the starches is corn syrup solids.

6. The composition of claim 1 in which at least one of the starches is cold water soluble.

7. The composition of claim 1 in which at least one of the starches is gelatinized.

8. The composition of claim 1 in which at least one of the starches is a starch ester.

9. The coating composition of claim 8 in which the starch ester comprises ester units of one or more aliphatic, unsaturated hydrocarbon, or aromatic moieties with 1 to 18 carbon atoms, and in which the starch ester degree of substitution is about 0.1 to about 3.0.

10. The coating composition of claim 8 in which the starch ester comprises ester units of one or more aliphatic, unsaturated hydrocarbon, or aromatic moieties with 1 to 18 carbon atoms, and in which the starch ester degree of substitution is about 1.5 to about 3.0.

11. The composition of claim 1 further comprising a water soluble acrylic polymer or copolymer.

12. The composition of claim 1 in which at least one of the starches has a dextrose equivalency (DE) in the range of about 5 to about 30.

13. The composition of claim 1 in which at least one of the starches has a dextrose equivalency (DE) in the range of about 5 to about 20.

14. The composition of claim 1 in which at least one of the starches is soluble or dispersible in a solvent or solvent mixture with a solubility parameter of greater than about 14 $MPa^{1/2}$.

15. The composition of claim 1 in which at least one of the starches is soluble or dispersible in a solvent or solvent mixture with a solubility parameter of greater than about 29 $Mpa^{1/2}$.

16. The composition of claim 1 in which at least one of the starches is soluble or dispersible in a solvent or solvent mixture with a solubility parameter of about 14 to about 29 $Mpa^{1/2}$.

17. The composition of claim 1 in which at least one of the starches is soluble or dispersible in a solvent or solvent mixture with a solubility Y9 parameter of about 17 to about 26 $Mpa^{1/2}$.

18. The composition of claim 1 in which the composition is solvent based.

19. The composition of claim 1 in which the composition is radiation curable and further comprising one or more radiation curable monomers, oligomers, or combinations thereof.

20. The composition of claim 1 in which the composition is water based.

21. The coating composition of claim 3 in which the colorant is present in the amount of about 2-20 weight %, and the starch is present in the amount of about 1-30 weight %.

22. A method of printing comprising applying a composition as in claim 1 onto a substrate by use of a printing process to form a printed substrate.

23. The method of claim 22 in which the printing process is a member of the group consisting of flexography, screen printing, gravure printing, and lithography.

24. The method of claim 22 in which the substrate is a member of the group consisting of coated or uncoated paper, board, towel, or tissue substrate.

25. The method of claim 22 in which the substrate is a member of the group consisting of a plastic film or a nonwoven substrate.

26. The method of claim 22 in which the printed substrate meets or exceeds the rate of biodegradation as specified in ASTM D6400-99 or ASTM D6868-03.

27. The method of claim 22 in which the printed substrate is compostable by the standards as specified in ASTM D6400-99 or ASTM D6868-03.

28. A substrate or printed article having the composition as in claim 1 on the surface thereof.

29. A substrate or printed article as produced by the method as in claim 22.

* * * * *